April 19, 1966  E. TUTTE ETAL  3,247,076
FUEL ELEMENTS FOR NUCLEAR REACTORS WITH LATERAL SUPPORT MEANS
Filed July 3, 1963  2 Sheets-Sheet 1

United States Patent Office 3,247,076
Patented Apr. 19, 1966

3,247,076
FUEL ELEMENTS FOR NUCLEAR REACTORS
WITH LATERAL SUPPORT MEANS
Edward Tutte, Netherton, Frodsham, and Anthony Francis Taylor, Runcorn, England, assignors to United Kingdom Atomic Energy Authority, London, England
Filed July 3, 1963, Ser. No. 292,564
Claims priority, application Great Britain, July 24, 1962, 28,407/62
3 Claims. (Cl. 176—66)

This invention relates to fuel elements for nuclear reactors and is concerned with elongated fuel elements for axial insertion into coolant-conducting passageways of nuclear reactors and to the problem of restraint of vibrations induced in the fuel elements by coolant flow along the passageways.

U.S. patent application Ser. No. 835,523 discloses a nuclear reactor having a graphite moderator structure disposed within a pressure vessel and penetrated by a lattice of vertically orientated passageways (fuel channels) housing elongated fuel elements inserted axially in the fuel channels. The fuel elements are cooled by a flow of pressurized gas passing upwardly through the channels and into a header vessel disposed above the moderator structure. The fuel elements are inserted, under load (that is, with coolant flowing through the reactor fuel channels) through tubular extensions (stand pipes) of the passageways which penetrate both the header vessel and the pressure vessel to connect the upper ends of the fuel channels with the charge face of the reactor. The parts of the stand-pipes which penetrate the header vessel are provided with ports to allow outflow of coolant into the header vessel. Under normal operating conditions, the upper ends of the stand-pipes are closed by seal plugs.

It has been found that, when inserting, under load, a fuel element into passageways of a reactor of the type disclosed by said application Ser. No. 835,523, the fuel element is subjected to vibration, particularly as it passes through the header vessel of the reactor where vibration is thought to arise from restriction, by the lower end of the fuel element, of coolant flow through the outflow ports of the respective stand-pipe. Such vibrations can be strong enough to cause damage to a fuel element and the invention seeks to provide a fuel element wherein coolant flow-induced vibrations are restrained.

According to the invention, an elongated fuel element for axial insertion into a coolant-conducting passageway of a nuclear reactor carries at least three lateral-support members free to be displaced radially outwards by coolant flow along the passageway so as to reach the wall of the passageway and restrain any tendency for coolant flow-induced vibration of said fuel element.

An embodiment of the invention will now be described by way of example with reference to the accompanying drawings wherein.

Figure 2:
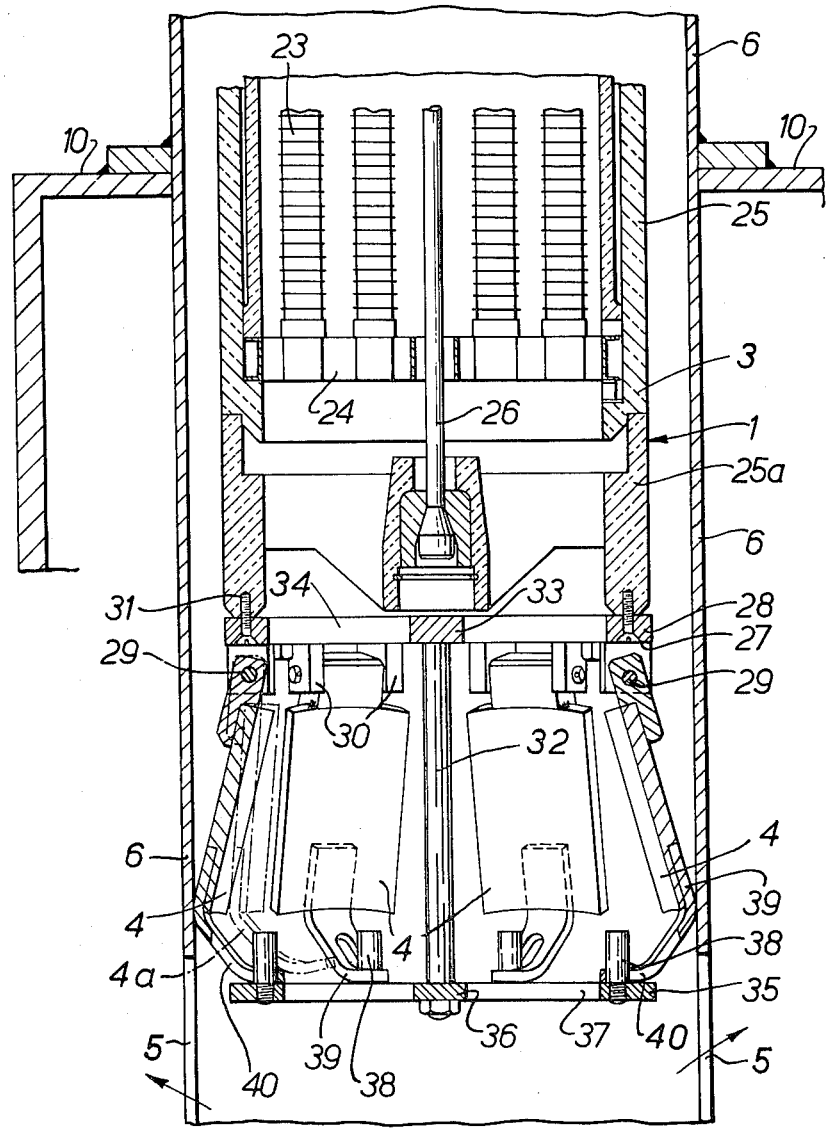
FIGURE 2 is an enlarged detail, partly in section, of the box II of FIGURE 1.

Referring to the figures; an elongated fuel element 1 in the act of being axially inserted, under load, into a vertical stand-pipe 6 of a nuclear reactor 2 carries at its lower or entry end 3 (FIGURE 2 only) six equi-spaced flap-like lateral-support members 4 (only four of which are shown in FIGURE 2) pivotally mounted so as to be displaced radially outwards (as shown in FIGURE 2) by coolant flow along the stand-pipe 6 so as to reach the wall of the stand-pipe 6 and restrain any tendency for coolant flow-induced vibration of the fuel element 1.

Figure 1:
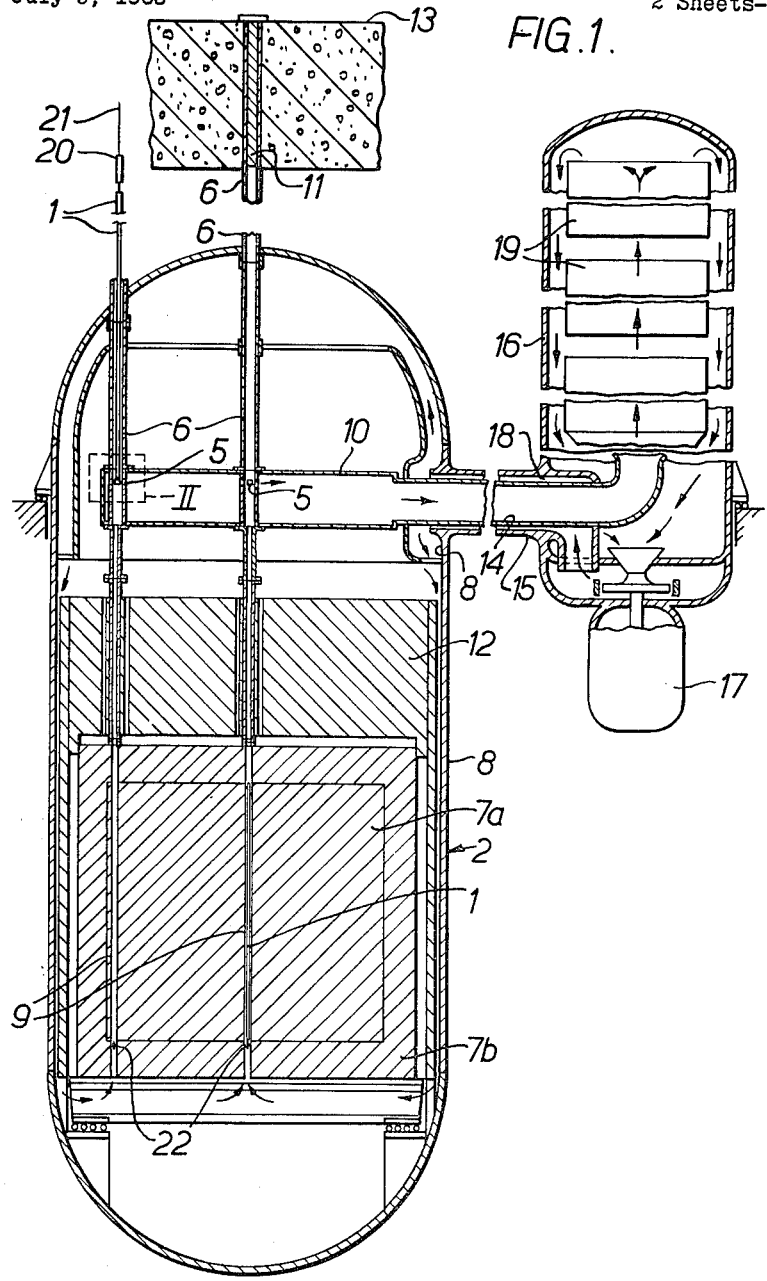
FIGURE 1 is a diagrammatic side view of a nuclear reactor.

The reactor 2 is of the kind disclosed in U.S. patent application Ser. No. 835,523 and has a graphite moderator and reflector structure 7a, 7b enclosed within a pressure vessel 8 and penetrated by a lattice of 250 vertically-orientated fuel channels 9 (only two being shown in FIGURE 1). The reactor 2 has a header vessel 10 disposed above the structure 7a, 7b, and 250 stand-pipes 6 penetrate the pressure vessel 8, header vessel 10 and neutron shielding 12 to connect the charge face 13 of the reactor with the upper ends of the fuel channels 9. The upper ends of the stand-pipes 6 are closed by seal plugs 11 and four coolant outflow ports 5 are provided in each of the stand-pipes 6 in the parts of the stand-pipes penetrating the header vessel 10.

The reactor 2 is connected, by coaxial ducts 14, 15, to a heat exchanger 16 and a blower assembly 17 circulates reactor coolant ($CO_2$ gas) through the annular space 18 between the ducts 14, 15, down between the structure 7a, 7b and the pressure vessel 8, up through the channels 9 to cool fuel elements 1 located therein, into the header vessel 10 and from thence to heat-exchange elements 19 within the heat exchanger 16 by way of the duct 14.

The fuel elements 1 are charged into the reactor 2 by a grab 20 suspended by a cable 21 from a hoist disposed within an "on-load" charge machine on the charge face 13 and connectable with the upper end of a stand-pipe 6. (U.S. Patent No. 3,158,544 discloses an "on-load" charge machine for a gas-cooled nuclear reactor.) When located in the channels 9, the fuel elements 1 are supported at their lower ends on stools 22 disposed in the reflector 7b.

The fuel elements 1 are of the kind disclosed in U.S. patent application Ser. No. 6,427 and each comprises a cluster of sheathed fuel rods 23 (FIGURE 2) end-located in grid-like support structures 24 and housed in a sleeve 25 of graphite. A tie-rod 26 extends through the fuel element and the fuel element is lifted and lowered by engagement of the grab 20 with the upper end of the tie-rod.

The support members 4 of each fuel element 1 are attached to the lower face 27 of an annular support 28 by pivot pins 29 extending horizontally through downwardly extending brackets 30. The support 28 is attached to an extension 25a by screws 31. A column 32 extends downwardly from a central boss 33 attached to the support 28 by webs 34. The column 32 carries at its lower end an annular base 35 attached to a central boss 36 by webs 37. The base 35 carries six equi-spaced pins 38 (only four being shown in FIGURE 2). The members 4 carry at their lower ends stop-members 39 having longitudinal slots 40 located by the pins 38.

The stand-pipes 6 are of 5.88 ins. bore. The outflow ports 5 are equi-spaced and are 3.5 ins. square. Coolant mass flow rate up through each stand-pipe 6 is, with the lower end of a fuel element 1 just level with the upper ends of the ports 5, 20.4 lb./sec. and with the ports 5 just covered by the fuel element, 3.1 lb./sec. up through the fuel element and 9.5 lb./sec. through the ports 5. The external diameter of the sleeve 25 of a fuel element 1 is 5 ins. The support members 4 are of rectangular section 2.5 ins. deep and 1.9 ins. wide. The pivot pins 29 are disposed on a 4.4-inch circle.

In operation, as a fuel element 1 is inserted axially first into a stand-pipe 6 and then into a fuel channel 9 below, coolant flow along the stand-pipe (or channel) displaces the support members 4 radially outwards about the pivot pins 29 to reach the wall of the stand-pipe 6 and thus give lateral support to the fuel element and hence restrain coolant flow-induced vibrations.

The length of the slots 40 in each of the stop members 39 is such that, in one extreme position, the lower ends of the support members 4 are prevented from moving inwardly beyond the centres of the pivot pins 29 (see the dotted lines 4a in FIGURE 2) and in the other extreme position, are prevented from projecting substantially further than the wall of a stand-pipe 6 (or channel 9).

Prevention of radially inward movement beyond the centres of the pins 29 ensures that the lower ends of the support members are always biased radially outwards so that they continue to move in that direction when acted upon by coolant flow. Also this prevention of movement ensures that the members 4 do not come into contact with each other and thus jam together.

We claim:

1. An elongated fuel element for axial insertion into a coolant-conducting vertically orientated passageway of a nuclear reactor, said fuel element carrying at least three radially movable lateral-support members provided at that end of the fuel element which first enters the passageway on charging of the fuel element thereinto, means operable by coolant flow for radially outwardly displacing said lateral-support members, and means always biasing said lateral support members radially outwardly so that they move in that direction when coolant flow acts upon said first-named means.

2. A fuel element as claimed in claim 1, wherein said biasing means comprise stop members for preventing radially inward movement of said lateral-support members beyond predetermined points.

3. A fuel element as claimed in claim 2, wherein said lateral-support members are pivotally mounted on the fuel element and said predetermined points are the pivot centers.

References Cited by the Examiner

UNITED STATES PATENTS 2,983,662   5/1961   Shillitto et al. _____ 176—81 X

FOREIGN PATENTS 685,819   5/1964   Canada.
807,751   1/1959   Great Britain.

REUBEN EPSTEIN, Primary Examiner.

CARL D. QUARFORTH, Examiner.